US012573358B2

(12) United States Patent
Mori

(10) Patent No.: US 12,573,358 B2
(45) Date of Patent: Mar. 10, 2026

(54) PEDAL DEVICE FOR PERFORMANCE

(71) Applicant: Ef-Note Inc., Hamamatsu (JP)

(72) Inventor: Yoshiaki Mori, Hamamatsu (JP)

(73) Assignee: Ef-Note Inc., Hamamatsu (JP)

( * ) Notice: Subject to any disclaimer, the term of this patent is extended or adjusted under 35 U.S.C. 154(b) by 649 days.

(21) Appl. No.: 17/558,863

(22) Filed: Dec. 22, 2021

(65) Prior Publication Data

US 2022/0114992 A1 Apr. 14, 2022

Related U.S. Application Data

(63) Continuation of application No. PCT/JP2020/025622, filed on Jun. 30, 2020.

(30) Foreign Application Priority Data

Jul. 1, 2019 (JP) ................................ 2019-123179

(51) Int. Cl.
*G10D 13/11* (2020.01)
*G10H 1/00* (2006.01)
*G10H 3/00* (2006.01)

(52) U.S. Cl.
CPC ........... *G10D 13/11* (2020.02); *G10H 1/0008* (2013.01); *G10H 3/00* (2013.01)

(58) Field of Classification Search
CPC ......... G10H 1/0008; G10H 3/00; G10D 13/11
USPC ............................................................ 84/746
See application file for complete search history.

(56) References Cited

U.S. PATENT DOCUMENTS

| | | | | |
|---|---|---|---|---|
| 8,410,348 B1 | 4/2013 | Hsieh | | |
| 8,742,244 B2 | 6/2014 | Wissmuller | | |
| 8,785,758 B2 | 7/2014 | Wissmuller | | |
| 2003/0094089 A1* | 5/2003 | Sato | G10D 13/065 | 84/422.3 |
| 2003/0200860 A1 | 10/2003 | Toda | | |
| 2010/0175545 A1* | 7/2010 | Muramatsu | G10H 1/348 | 84/746 |

FOREIGN PATENT DOCUMENTS

| | | |
|---|---|---|
| JP | H09-097075 A | 4/1997 |
| JP | 2003167574 A * | 6/2003 |

(Continued)

OTHER PUBLICATIONS

International Search Report and Written Opinion of the International Search Authority, issued in PCT/JP2020/025622, mailed Sep. 1, 2020; ISA/JP.

(Continued)

*Primary Examiner* — Jeffrey Donels
*Assistant Examiner* — Philip G Scoles
(74) *Attorney, Agent, or Firm* — Harness, Dickey & Pierce, P.L.C.

(57) ABSTRACT

A pedal device for performance (1) has a pedal (4) where a player can perform a depressing operation with his/her foot. A rod (6) is movable in an axial direction in accordance with the depressing operation of the pedal (4). A detecting mechanism detects an amount of movement of the rod (6) and outputs a detection signal corresponding to the amount of movement. The detecting mechanism has an optical sensor (10) that is a non-contact sensor detecting an amount of displacement in the axial direction L of the rod (6) in a non-contact manner.

8 Claims, 10 Drawing Sheets

(56) References Cited

FOREIGN PATENT DOCUMENTS

| | | | | |
|---|---|---|---|---|
| JP | 2007-086813 | A | | 4/2007 |
| JP | 2010-210890 | A | | 9/2010 |
| JP | 2014-077875 | A | | 5/2014 |
| JP | 6236555 | B1 | * | 11/2017 |
| JP | 2018-124415 | A | | 8/2018 |

OTHER PUBLICATIONS

International Preliminary Report on Patentability, issued in PCT/JP2020/025622, dated Dec. 28, 2021.

* cited by examiner

[ Fig. 1 ]
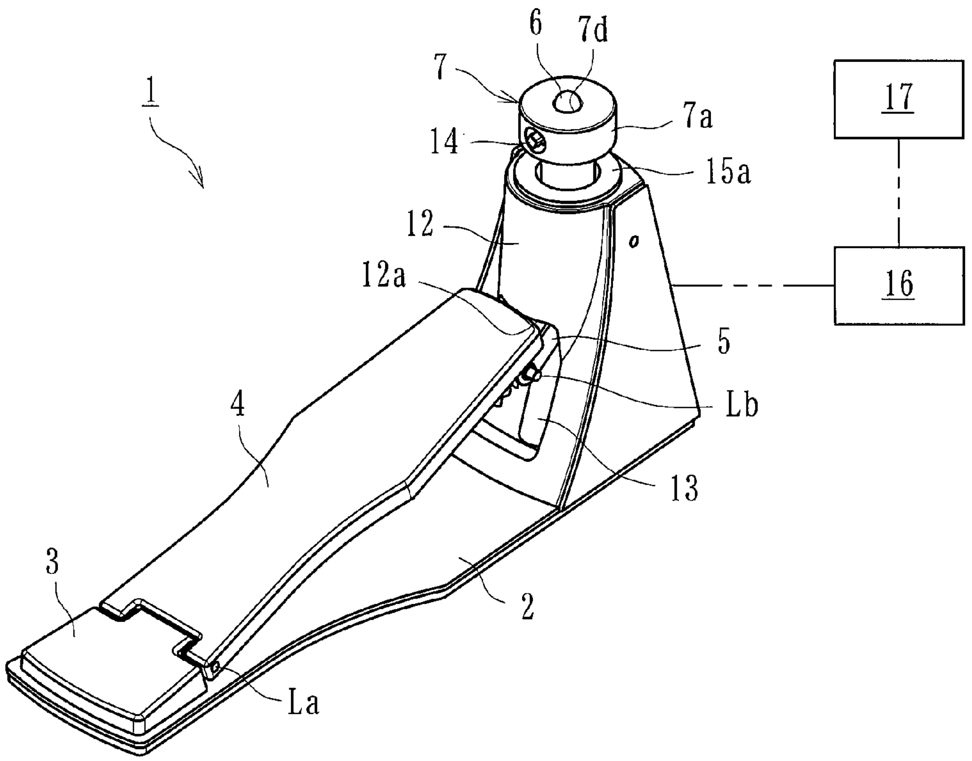

[ Fig. 2 ]
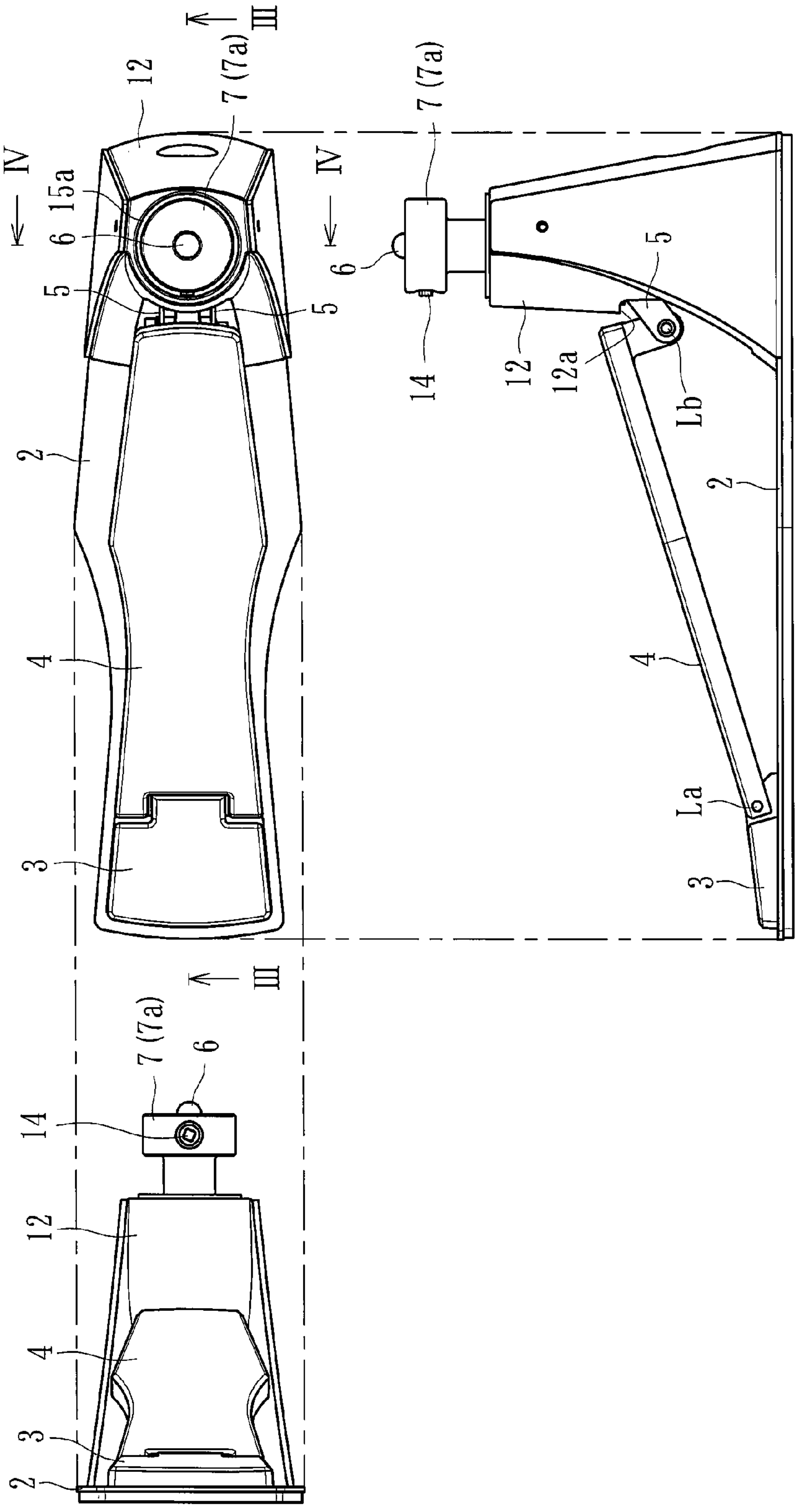

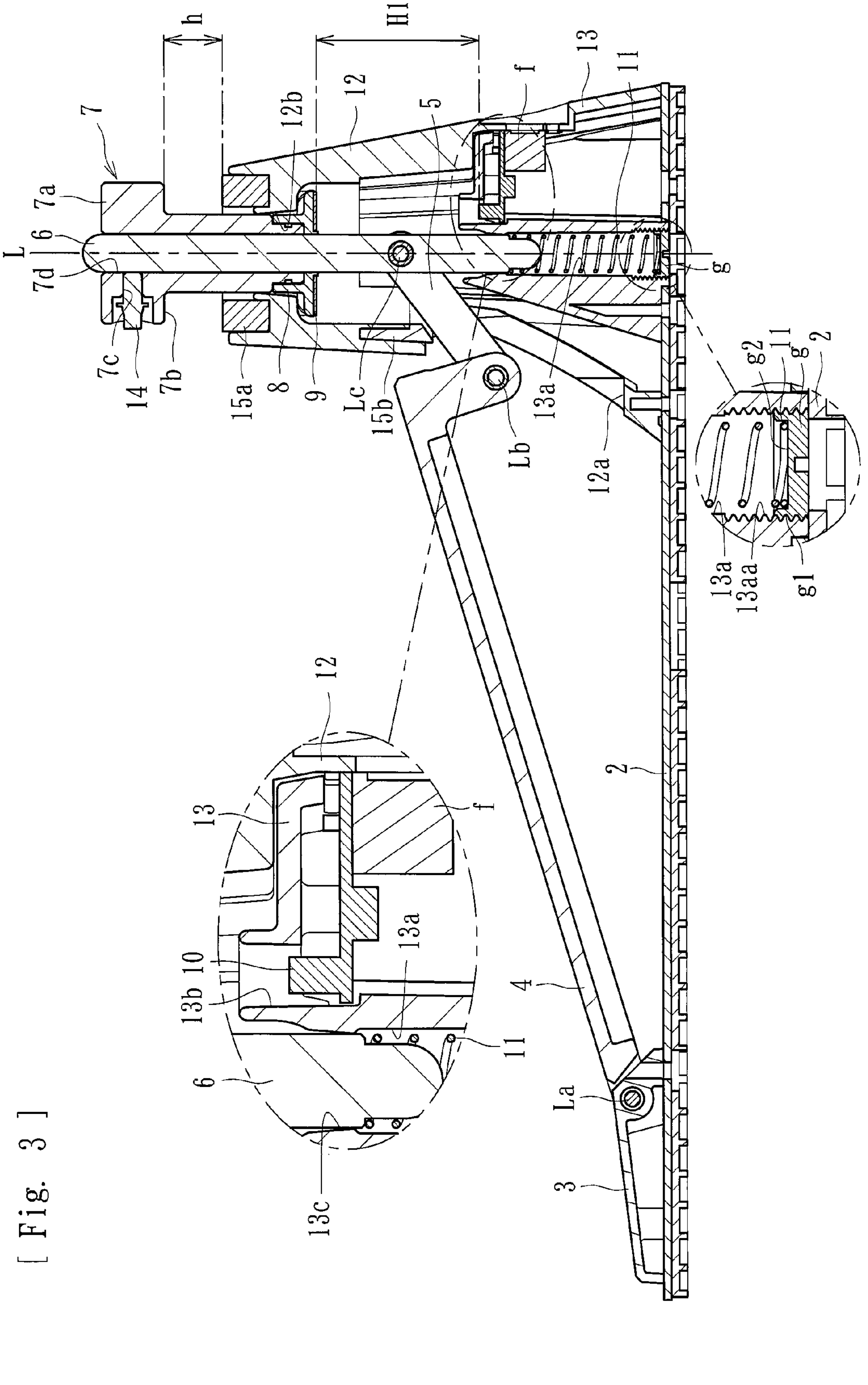
[ Fig. 3 ]

[ Fig. 4 ]
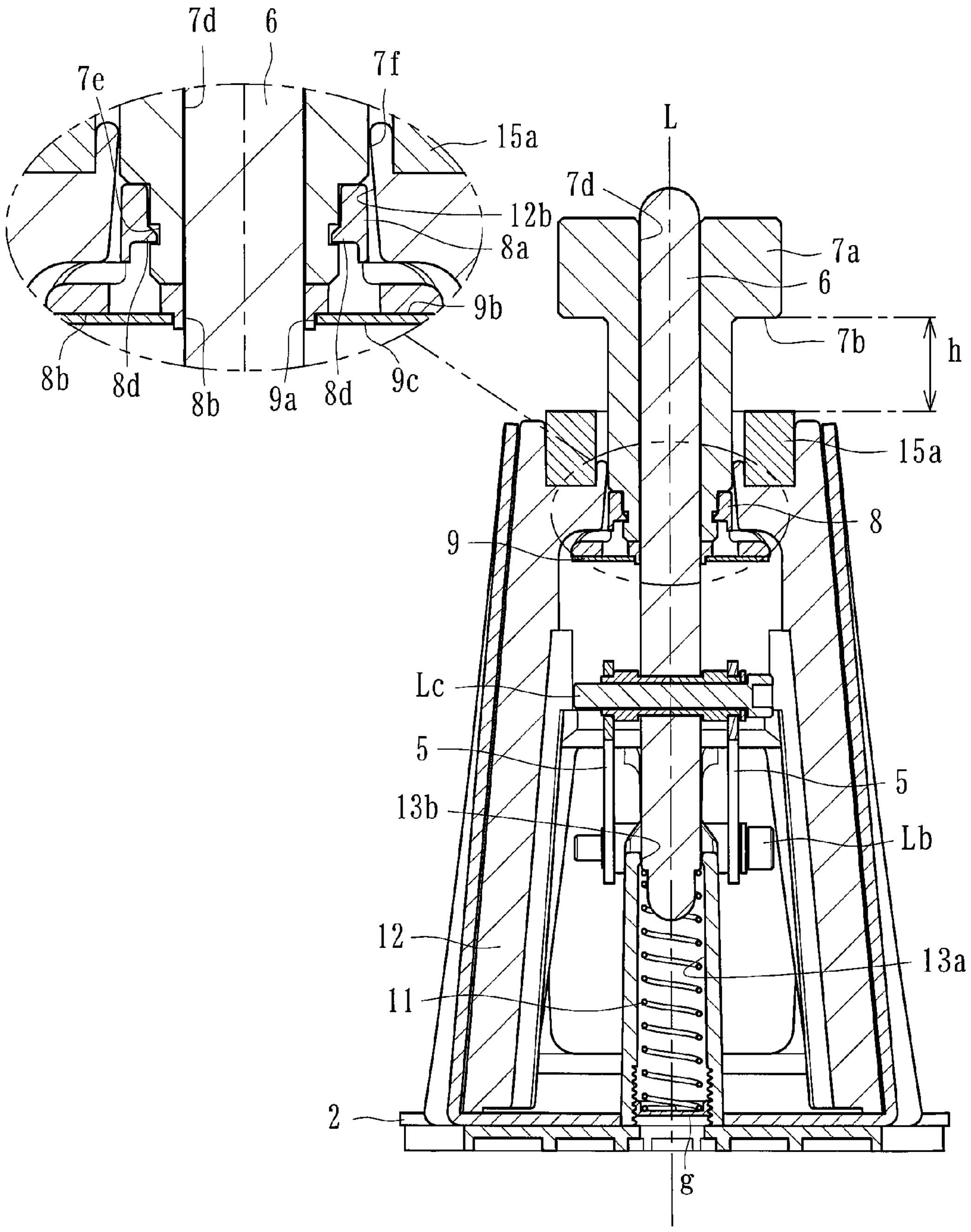

[ Fig. 5 ]
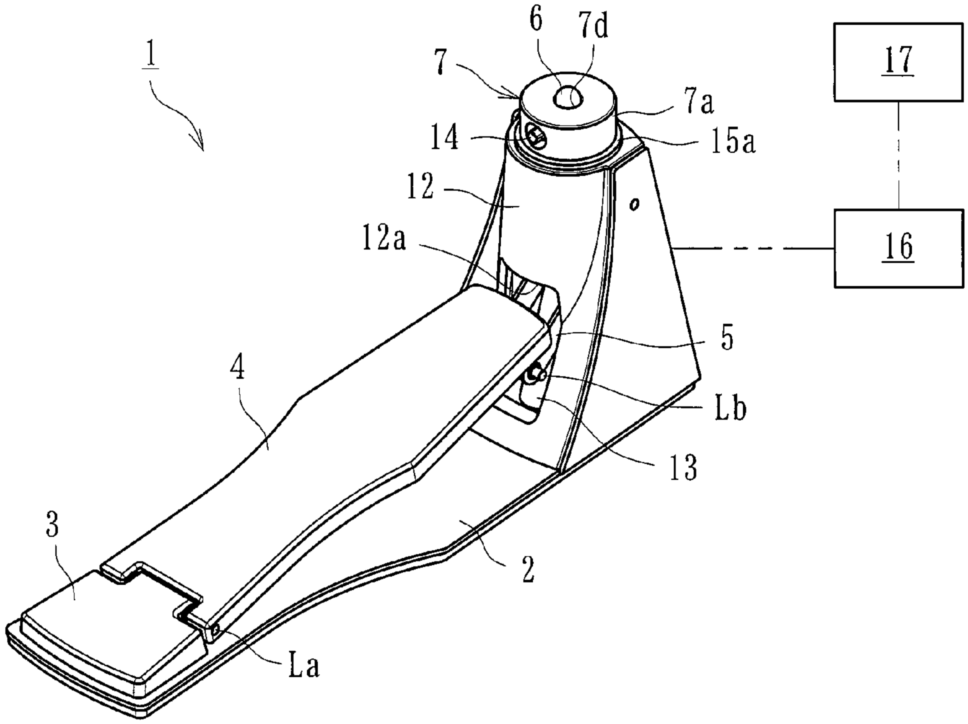

[ Fig. 6 ]
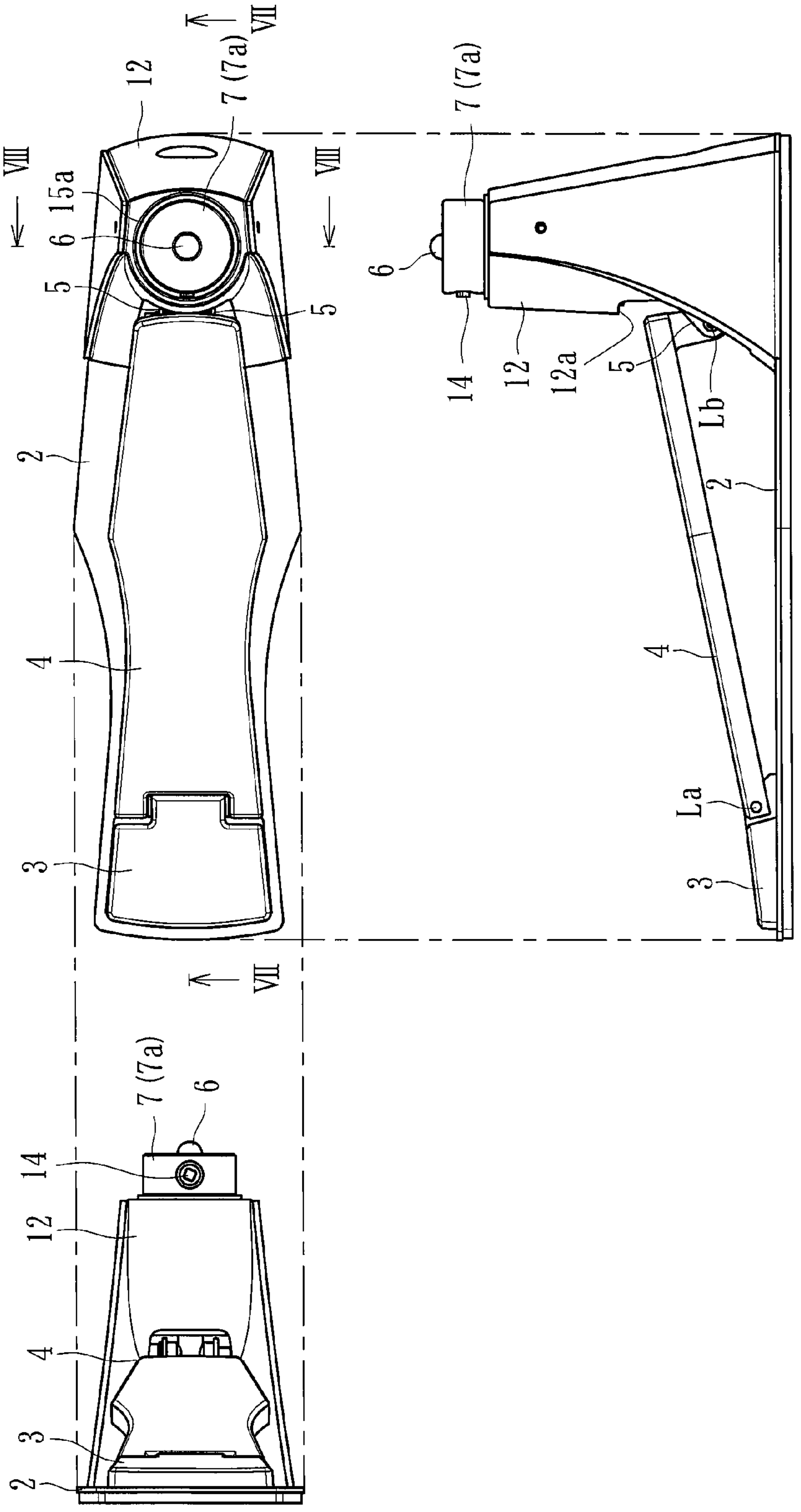

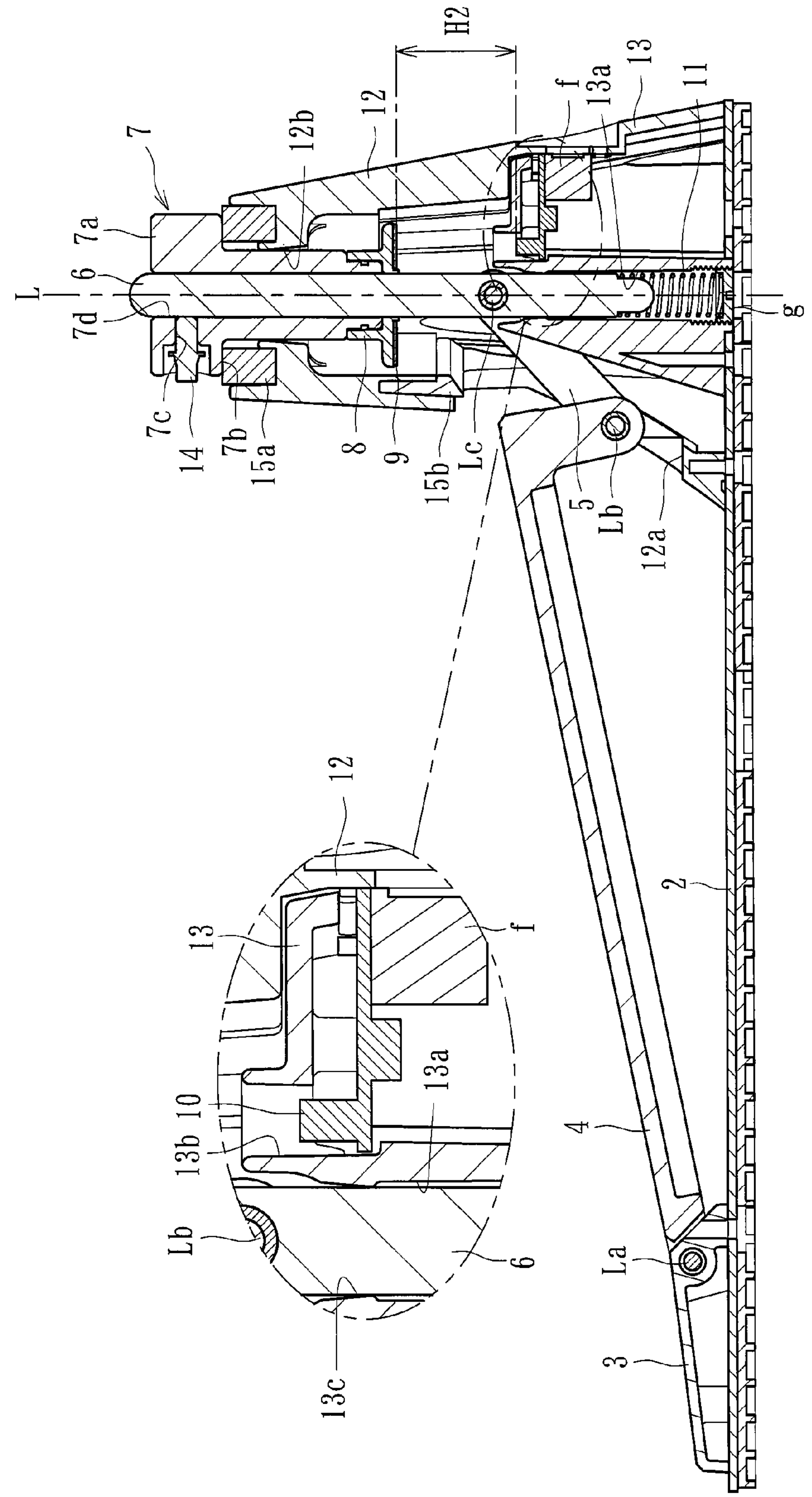
[ Fig. 7 ]

[ Fig. 8 ]
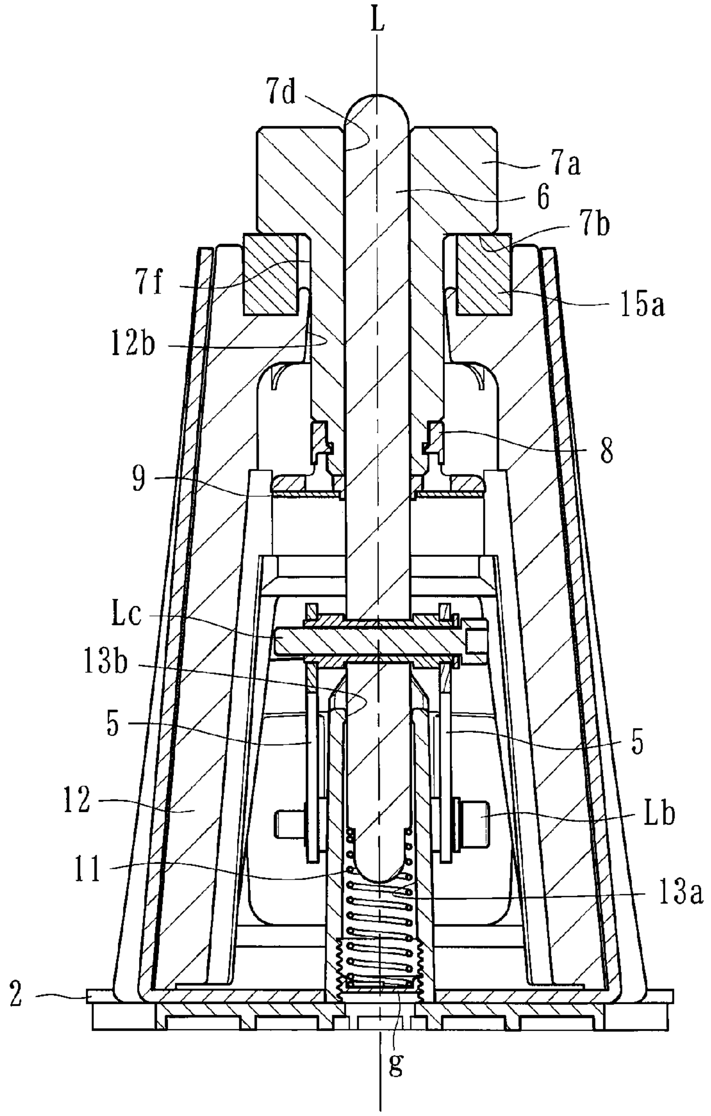

[ Fig. 9 ]
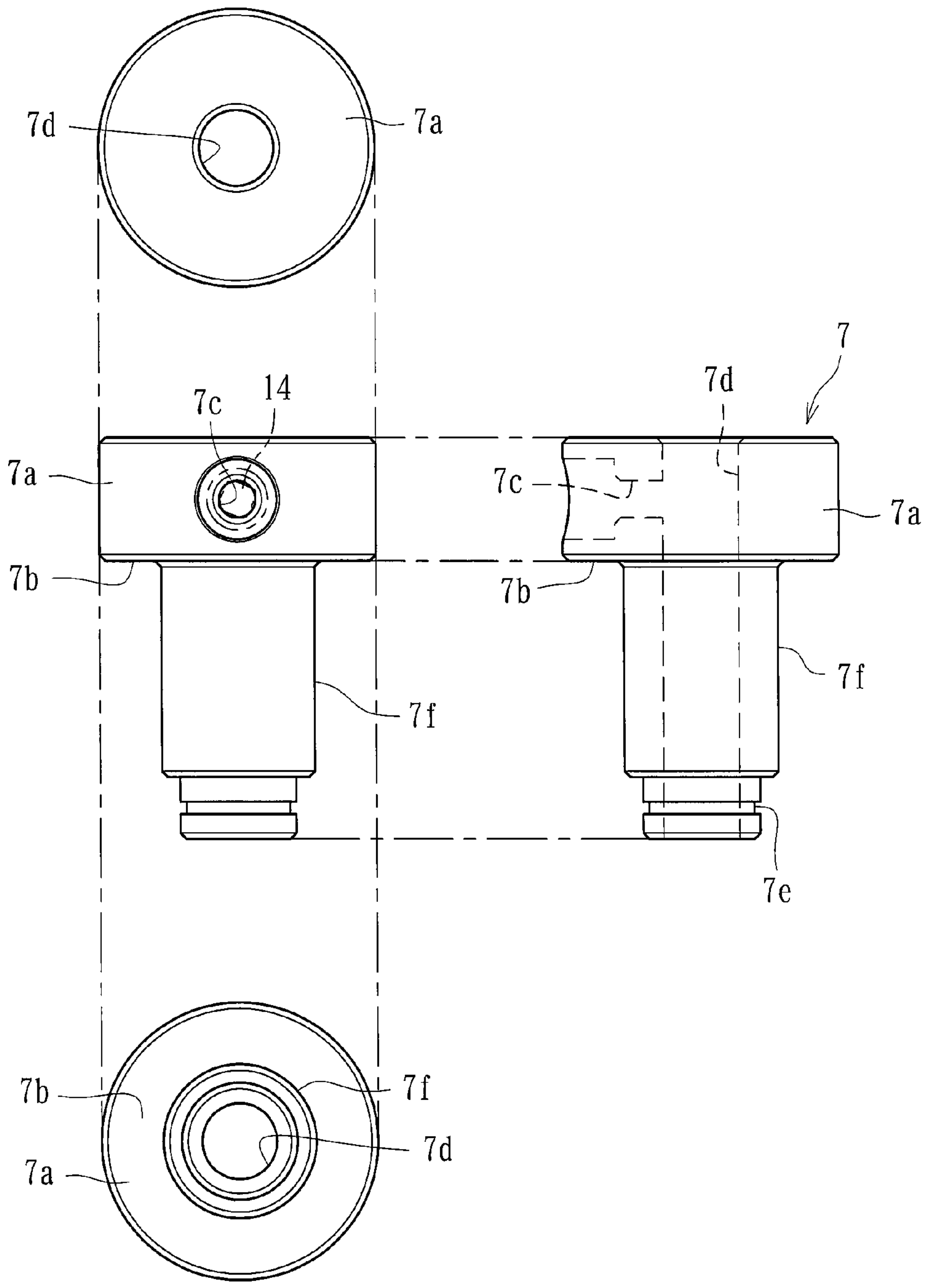

[ Fig. 10 ]
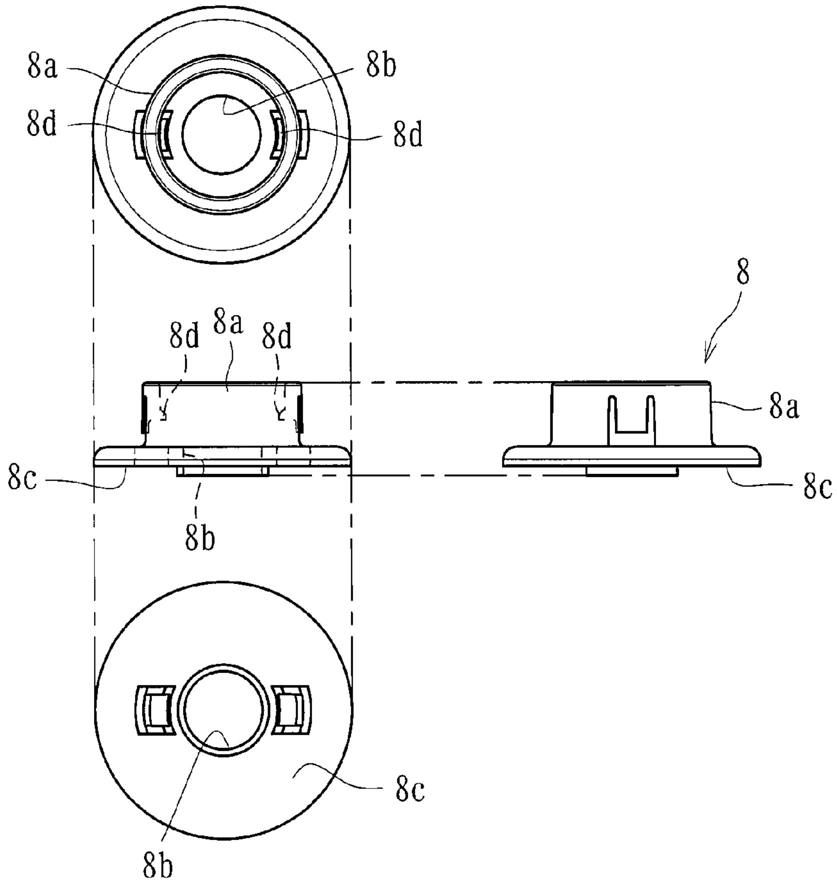
[ Fig. 11 ]
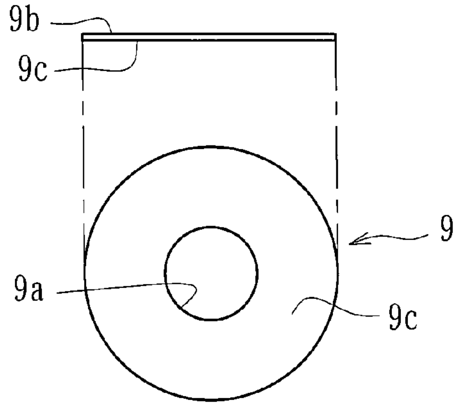

PEDAL DEVICE FOR PERFORMANCE

CROSS-REFERENCE TO RELATED APPLICATION

This application is a continuation of International Application No. PCT/JP2020/025622, filed Jun. 30, 2020, which claims priority to Japanese Application No. 2019-123179, filed Jul. 1, 2019. The disclosures of the above applications are incorporating herein by reference.

FIELD

The present disclosure relates to a pedal device for performance. It includes a pedal where a player can perform a depressing operation with his/her foot. A rod is movable in an axial direction in accordance with the depressing operation of the pedal. A detection sensor is capable of detecting an amount of movement of the rod and outputting a detection signal corresponding to the amount of movement.

BACKGROUND

Some electronic drums include a pedal device for performance that include a pedal where a player can perform a depressing operation with his/her foot during performance. For example, a pedal device for performance of related art includes a pedal, a shaft that turns integrally with the pedal in accordance with a depressing operation of the pedal, and detecting mechanism capable of detecting an amount of depression of the pedal (see, Japanese Unexamined Patent Application Publication No. H9-97075). The detecting mechanism in the pedal device for performance of the related art has been configured such that, when the depressing operation is performed on the pedal, a pressing force is applied to a sensor pattern via a sensor rubber. Hence the electric resistance of the sensor pattern varies.

SUMMARY

However, in the above-described related art, since the pressing force is applied to the sensor pattern via the sensor rubber, in accordance with the depressing operation of the pedal, the elastic force of the sensor rubber is transmitted to the player. This leads to a problem that it is not able to obtain a firm bottom-touching feeling that makes the player feel comfortable about their drum performance. Moreover, when the depressing force of the pedal is reduced, the restoring speed of the sensor rubber does not follow the operating speed of the pedal. This leads to a problem that it is not able to quickly reflect performance intention of the player.

The present disclosure is made in light of such situations. The disclosure provides a pedal device for performance capable of improving an operational feeling at the time of a depressing operation of a pedal. It quickly reflects performance intention of a player.

According to the disclosure, a pedal device for performance includes a pedal where a player can perform a depressing operation with his/her foot. A rod is movable in an axial direction in accordance with the depressing operation of the pedal. A detecting device detects an amount of movement of the rod and outputs a detection signal corresponding to the amount of movement. The detecting device includes a non-contact sensor that detects an amount of displacement in the axial direction of the rod in a non-contact manner.

According to the disclosure, the pedal device for performance includes a stopper member. The stopper member is attached to a desirable position of the rod. It restricts movement of the rod when the pedal is depressed to a maximum depression position. A member, to be detected, is attached to the stopper member. Thus, it is movable integrally with the rod and the stopper member and allows the detecting device to detect positions of the rod and the stopper member.

According to the disclosure, the stopper member has a predetermined weight and can function as a weight.

According to the disclosure, the stopper member is movable together with the rod while being guided in the axial direction of the rod.

According to the disclosure, the pedal and the rod are coupled by a link member that converts a rocking motion of the pedal into a linear movement of the rod.

According to the disclosure, the detecting device is composed of an optical sensor that emits light toward the member to be detected. The detecting device receives reflected light from the member to be detected. Hence, it can detect positions of the rod and the stopper member.

According to the disclosure, the member to be detected is composed of a disk-shaped reflecting plate. It is rotatably attached around the rod as a center.

According to the disclosure, the pedal device for performance includes an urging member for urging the rod and an urging holding portion that adjustably holds an urging force of the urging member.

According to the disclosure, the detecting device comprises a non-contact sensor that detects an amount of displacement in the axial direction of the rod in a non-contact manner. Accordingly, an operational feeling at the time of the depressing operation of the pedal can be improved and performance intention of the player can be reflected quickly.

According to the disclosure, the stopper member is attached to the desirable position on the rod. It restricts the movement of the rod when the pedal is depressed to the maximum depression position. The member to be detected is attached to the stopper member. Thus, it is movable integrally with the rod and the stopper member. This enables the detecting device to detect the positions of the rod and the stopper member. Accordingly, the depression stroke of the pedal can be desirably adjusted by desirably adjusting the attachment position of the stopper member with respect to the rod. The separation dimension between the detecting device and the member to be detected can be a maintained constant at the lower limit position of the rod regardless of the attachment position of the stopper member. Thus, even though the attachment position of the stopper member, with respect to the rod, is desirably adjusted, it is not necessary to change the setting of the detecting device at the maximum depression position of the pedal.

According to the disclosure, the stopper member has the predetermined weight and can function as the weight. Accordingly, inertia can be provided during the depressing operation of the pedal. Thus, the operational feeling of the player can be further improved. Moreover, the stopper member can have both a weight function, for improving the operational feeling, and a restriction function of the rod at the maximum depression position of the pedal.

According to the disclosure, the stopper member is movable together with the rod while being guided in the axial direction of the rod. Accordingly, the weight can be moved in the sliding direction of the rod. Thus, the operational feeling can be further improved.

According to the disclosure, the pedal and the rod are coupled by the link member. The link member converts the rocking motion of the pedal into the linear movement of the rod. Accordingly, the depressing operation of the pedal can be reliably and appropriately converted into the linear movement of the rod.

According to the disclosure, the detecting device includes the optical sensor that emits light toward the member to be detected. It receives reflected light from the member to be detected. Hence, it can detect the positions of the rod and the stopper member. Accordingly, the amount of displacement in the axial direction of the rod can be stably and reliably detected in a non-contact manner.

According to the disclosure, the member to be detected includes the disk-shaped reflecting plate. It is rotatably attached around the rod as the center. Accordingly, the light emitted from the optical sensor can be reliably received and reflected even when the rod rotates around the axis.

According to the disclosure, the urging member urges the rod. The urging holding portion adjustably holds the urging force of the urging member. Thus, the feeling at the time of the depressing operation of the pedal can be desirably changed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an overall appearance of a pedal device for performance.

FIG. 2 is a three-side view, elevation, plan and side, of the pedal device for performance.

FIG. 3 is a cross-sectional view of FIG. 2 taken along line III-III.

FIG. 4 is a cross-sectional view of FIG. 2 taken along line IV-IV.

FIG. 5 is a perspective view of an overall appearance of the pedal device for performance after the depressing operation.

FIG. 6 is a three-side view, elevation, plan and side, of the pedal device for performance.

FIG. 7 is a cross-sectional view of FIG. 6 taken along line VII-VII.

FIG. 8 is a cross-sectional view of FIG. 6 taken along line VIII-VIII.

FIG. 9 is a four-side view, plan, elevation, plan and elevation, of a stopper member in the pedal device for performance.

FIG. 10 is a four-side view, plan, elevation, plan and elevation, of a coupling member in the pedal device for performance.

FIG. 11 is a front elevation view and a plan view of a reflecting plate in the pedal device for performance.

DETAILED DESCRIPTION

Hereinafter, an embodiment of the present disclosure will be described in detail with reference to the drawings.

A pedal device for performance 1, according to the present embodiment, is connected to an electronic drum or the like performance unit 17, via a control unit 16. As illustrated in FIGS. 1 to 8, the pedal device for performance 1 includes a bottom plate 2, a pedal 4, a rod 6, a stopper member 7, a coupling member 8, a reflecting plate 9 (member to be detected), an optical sensor 10 (detecting device), urging member 11, a housing member 12, a case 13, and members to be abutted 15*a* and 15*b*.

The bottom plate 2 includes a plate-shaped member that can be placed on a floor surface. An attachment portion 3 is fixed to a proximal end portion of the bottom plate 2. The housing member 12 is attached to a distal end portion of the bottom plate 2. A proximal end portion of the pedal 4 is attached to the attachment portion 3, via a shaft La. The pedal 4 is supported such that a rocking operation around the shaft La, as the center, can be performed. The housing member 12 includes a resin molded product, such as ABS or nylon. The rod 6 is housed therein while being movable in an axial direction L.

On the pedal 4, a player can perform a depressing operation with his/her foot. The pedal 4 includes an aluminum plate-shaped member formed in a shape corresponding to the shape of a foot. A distal end portion of the pedal 4 is formed to be bent downward. One end of a steel link member 5 is attached to the bent portion, via a shaft Lb. The one end of the link member 5 is attached to the distal end portion of the pedal 4, via the shaft Lb, and the other end is attached to the rod 6, via a shaft Lc.

The link member 5 is coupled to the distal end portion of the pedal 4 so as to be turnable around the shaft Lb, as the center. It is coupled to the rod 6 so as to be turnable around the shaft Lc, as the center. Thus, a rocking motion of the pedal 4 can be converted into a linear movement of the rod 6. Thus, when the player depresses the pedal 4 with his/her foot and performs a rocking operation, the depressing force is transmitted to the rod 6, via the link member 5. The rod 6 moves linearly in the axial direction L, longitudinal direction.

The rod 6 includes a steel bar-shaped member with a circular cross section. It is movable in the axial direction L in accordance with the depressing operation of the pedal 4. The urging member 11 is attached to a lower end portion of the rod 6. The urging member 11 includes a coil spring that urges the rod 6 upward. As illustrated in FIGS. 3 and 4, the urging member 11, housed in a housing space 13*a* formed in the case 13, applies an urging force as the rod 6 moves downward. An insertion hole 13*c* is formed in the housing space 13*a* of the case 13. The lower end portion of the rod 6 is inserted into the insertion hole 13. The rod 6 can move upward and downward while being guided by an opening edge of the insertion hole 13*c*.

In the present embodiment, an urging holding portion g or cap is attached to a lower portion of the urging member 11 in the housing space 13*a*. The urging holding portion g adjustably holds the urging force of the urging member 11. As illustrated in FIG. 3, the urging holding portion g includes a male screw portion g1 formed in an outer peripheral surface. A receiving portion g2 receives a lower end of the urging member 11. The urging holding portion g is assembled by screwing the male screw portion g1 into a female screw portion 13*aa* formed in an inner peripheral wall surface of the housing space 13*a*.

Accordingly, when the urging holding portion g is rotated, the urging holding portion g moves upward and downward in the housing space 13*a*. Thus, the urging force of the urging member 11 can be adjusted. Accordingly, the urging member 11 urges the rod 6 and the urging holding portion g adjustably holds the urging force of the urging member 11.

Thus, the feeling at the time of the depressing operation of the pedal 4 can be desirably changed.

The stopper member 7 includes a steel member that is attached to a desirable position on an upper end portion of the rod 6. The stopper member 7 restricts movement of the rod 6 when the pedal 4 is depressed to a maximum depression position (see FIGS. 5 to 8). As illustrated in FIG. 9, the stopper member 7 includes a weight portion 7*a*, an abutting portion 7*b*, a communication hole 7*c* formed in the weight portion 7*a*, a through hole 7*d*, an attachment groove 7*e* and a sliding surface 7*f*. The through hole 7*d* is formed at the center of the stopper member 7 to extend through the stopper member 7 in the up-down direction. The attachment groove 7*e* is formed in a lower end portion of the stopper member 7.

The stopper member can be attached at a desirable position on the rod 6 by inserting the rod 6 through the through hole 7*d* and tightening an adjusting member 14, such as a screw inserted into the communication hole 7*c*, at a desirable position of the rod 6 with respect to an outer peripheral surface of the rod 6. The stopper member 7 is inserted through an insertion hole 12*b* formed in the housing member 12 attached to the desirable position of the rod 6. When the rod 6 moves in the axial direction L, in accordance with the depressing operation of the pedal 4, the sliding surface 7*f* can slide while being guided by an opening edge portion of the insertion hole 12*b*.

The abutting portion 7*b* includes a step portion formed at the boundary between the weight portion 7*a* and the sliding surface 7*f*. The abutting portion 7*b* abuts against the member to be abutted 15*a* formed on an upper surface of the housing member 12. This restricts further movement of the rod 6 when the pedal 4 is depressed to the maximum depression position in a process where the rod 6 and the stopper member 7 move in the axial direction L in accordance with the depressing operation of the pedal 4.

That is, when the stopper member 7 is attached to a desirable position of the rod 6, as illustrated in FIGS. 3 and 4, the abutting portion 7*b* and the member to be abutted 15*a* are separated by a dimension h. When the depressing operation is performed on the pedal 4, downward movement of the rod 6 is allowed while the abutting portion 7*b* moves within the dimension h. When the abutting portion 7*b* moves downward by the dimension h, as illustrated in FIGS. 7 and 8, the stopper member 7 abuts against the member to be abutted 15*a*. This restricts further downward movement of the stopper member 7. The member to be abutted 15*a*, according to the present embodiment, includes compressed felt or hard rubber. Thus, when the abutting portion 7*b* of the steel rod 6 abuts against the member to be abutted 15*a*, the hard members come into contact with each other. Thus, a firm bottom-touching feeling can be obtained.

The weight portion 7*a* includes a large-diameter portion formed in an upper portion of the stopper member 7. It has a predetermined weight to function as a weight. The weight of the weight portion 7*a* varies in accordance with the size. It is appropriately set together with the urging force of the urging member to obtain a feeling for optimum performance. In the present embodiment, the weight of the stopper member 7 is about 400 g, and is appropriately about 250 to 1000 g. When the depressing operation is performed on the pedal 4, the stopper member 7 is movable together with the rod 6 while being guided in the axial direction L of the rod 6 by the opening edge portion of the insertion hole 12*b* formed in the housing member 12.

The attachment groove 7*e* has a groove shape formed in a lower portion of the stopper member. The groove 7*e* is configured such that the coupling member 8, made of ABS, is attached to it. As illustrated in FIG. 10, the coupling member 8 includes a substantially disk-shaped member. It includes a protruding portion 8*a* formed to protrude in an annular shape at the center. A through hole 8*b* extends through the coupling member 8 in the up-down direction. Also, it has an attachment surface 8*c* and protrusions 8*d* formed in the through hole 8*b*.

The lower portion of the stopper member 7 is inserted through the inside of the protruding portion 8*a*. The protrusions 8*d* are fit into the attachment groove 7*e* for securement. Thus, the coupling member 8 is attached to the lower portion of the stopper member 7. The reflecting plate 9 (member to be detected) is attached to the attachment surface 8*c* of the coupling member 8. Thus, the reflecting plate 9 is attached to the lower portion of the stopper member 7 via the coupling member 8.

The reflecting plate 9 is attached to the stopper member 7 so as to be movable integrally with the rod 6 and the stopper member 7. It is made of white foamed PVC that enables the optical sensor 10 (detecting device) to detect the positions of the rod 6 and the stopper member 7. As illustrated in FIG. 11, the reflecting plate 9 includes a disk-shaped with an attachment surface 9*b*. The attachment surface 9*b* is fixed in alignment with the attachment surface 8*c* of the coupling member 8. A reflection surface 9*c* faces the optical sensor 10.

The reflection surface 9*c* includes an annular surface for reflecting the light emitted from the optical sensor 10 attached to the case 13. For example, in order to reflect the light reliably and appropriately, it is preferable to apply a mirror finish or attach a white-based PVC foam sheet to the reflection surface 9*c*. The reflecting plate 9 (member to be detected) according to the present embodiment has an insertion hole 9*a* formed at a central position. The rod 6 is inserted through and attached to the insertion hole 9*a* such that the reflecting plate 9 is rotatable around the rod 6, as the center.

The optical sensor 10 (detecting device) is a non-contact sensor capable of detecting an amount of movement of the rod 6. It outputs a detection signal corresponding to the amount of movement, via an output terminal f. The sensor 10 detects an amount of displacement in the axial direction L of the rod 6 in a non-contact manner by optically detecting the amount of displacement. Specifically, the optical sensor 10, according to the present embodiment, includes a light emitting portion, that emits light to the reflecting plate 9, and a light receiving portion, that receives reflected light. The optical sensor 10 is disposed in the case 13 fixed to the bottom plate 2. By causing the emitted light and the reflected light to pass through an opening 13*b* formed in the case 13, the position of the rod 6 is detected and hence the amount of displacement of the rod 6 can be detected. For example, the light emitting portion includes an LED that emits infrared light. The reflected light from the reflecting plate 9 is received by the light receiving portion including a phototransistor. An electrical signal, corresponding to the amount of the received light, is outputted. The amount of displacement of the rod 6 is detected.

That is, before the depressing operation is performed on the pedal 4, as illustrated in FIG. 3, the rod 6 and the stopper member 7 are detected at an initial positions by detecting a separation dimension H1, for example, 50 mm, between the optical sensor 10 and the reflecting plate 9. When the pedal 4 is depressed to the maximum depression position, as illustrated in FIG. 7, the rod 6 and the stopper member 7 are detected at maximum downward-movement positions by detecting a separation dimension H2, for example, 30 mm, between the optical sensor 10 and the reflecting plate 9.

Although the optical sensor 10, according to the present embodiment, is disposed on the fixed side in the case 13 and the reflecting plate 9 is attached to the stopper member 7, the optical sensor 10 may be attached to the stopper member 7 and the reflecting plate 9 may be disposed on the fixed side of the case 13 or the like. That is, the optical sensor 10 is disposed on at least one of the stopper member 7 side and the fixed side. The reflecting plate 9, that can reflect the light emitted from the optical sensor 10, is disposed on the other of the stopper member 7 side and the fixed side.

The case 13 is attached to the inside of the housing member 12. The link member 5 can be inserted into the housing member 12, via an opening 12*a*. The member to be abutted 15*b*, that abuts against the link member 5 in a state where the depressing operation is not performed on the pedal 4, is attached to an upper edge portion of the opening 12*a*. That is, in the state where the depressing operation is not performed on the pedal 4, the link member 5 abuts against the member to be abutted 15*b* to hold the rod 6 at a predetermined position. When the pedal 4 is depressed to the maximum depression position, the abutting portion 7*b* abuts against the member to be abutted 15*a* to restrict further downward movement of the rod 6. The member to be abutted 15*b*, according to the present embodiment, includes felt or hard rubber. It prevents noise when the steel link member 5 abuts against the member to be abutted 15*b*.

A detection signal of the optical sensor 10 is output to the control unit 16 via the output terminal f. The control unit 16 is connected to the performance unit 17, such as an electronic drum. The performance unit 17 generates a musical sound signal based on a detection signal of the optical sensor 10 and a detection signal of the performance unit 17 and outputs the musical sound signal to an external speaker. That is, the control unit 16 processes both a detection signal generated by striking on the performance unit 17 and a detection signal acquired from the optical sensor 10. The control unit 16 generates a musical sound signal with optimum strength and timbre to be output from the external speaker.

According to the present embodiment, the detecting device detects an amount of movement of the rod 6 and outputs the detection signal, corresponding to the amount of movement. The detecting device includes the non-contact sensor (optical sensor 10) that detects an amount of displacement in the axial direction of the rod 6 in a non-contact manner. Accordingly, an operational feeling at the time of the depressing operation of the pedal 4 can be improved and performance intention of the player can be reflected quickly. In particular, the detecting device, according to the present embodiment, includes the optical sensor 10 that emits light, toward the member to be detected (reflecting plate 9), and receives reflected light, from the member to be detected (reflecting plate 9). Hence, it can detect the positions of the rod 6 and the stopper member 7. Accordingly, the amount of displacement in the axial direction L of the rod 6 can be stably and reliably detected in a non-contact manner.

Moreover, the member to be detected, according to the present embodiment, includes the disk-shaped reflecting plate 9. It is rotatably attached around the rod 6, as the center. Accordingly, the light emitted from the optical sensor 10 can be reliably received and reflected even when the rod 6 rotates around the axis. When the cross-sectional shape of the rod 6 is not a circular shape but is another shape that cannot rotate around the axis, the reflecting plate 9 (member to be detected) does not have to be rotatable around the rod 6, as the center.

Further, the stopper member 7 is attached to the desirable position of the rod 6. It restricts the movement of the rod 6 when the pedal 4 is depressed to the maximum depression position. The reflecting plate 9 (member to be detected) is attached to the stopper member 7 so as to be movable integrally with the rod 6 and the stopper member 7. This enables the detecting device (optical sensor 10) to detect the positions of the rod 6 and the stopper member 7. Thus, the depression stroke of the pedal 4 can be desirably adjusted by desirably adjusting the attachment position of the stopper member 7 with respect to the rod 6. Accordingly, the separation dimension H2, (see FIG. 7), between the detecting device (optical sensor 10) and the member to be detected (reflecting plate 9) can be maintained constant at the lower limit position of the rod 6 regardless of the attachment position of the stopper member 7.

That is, when the attachment position of the stopper member 7, with respect to the rod 6, is desirably adjusted, the separation dimension H1, (see FIG. 3), between the detecting device (optical sensor 10) and the member to be detected (reflecting plate 9), varies at the upper limit position, a position before the depressing operation is performed on the pedal 4, of the rod 6. The separation dimension H2, (see FIG. 7), between the detecting device (optical sensor 10) and the member to be detected (reflecting plate 9), is maintained constant at the lower limit position of the rod 6, when the pedal 4 is depressed to the maximum depression position. Thus, even though the attachment position of the stopper member 7 with respect to the rod 6 is desirably adjusted, it is not necessary to change the setting of the detecting mechanism (optical sensor 10) at the maximum depression position of the pedal 4.

Furthermore, the stopper member 7, according to the present embodiment, has the predetermined weight and can function as the weight. Accordingly, inertia can be provided during the depressing operation of the pedal 4, and the operational feeling of the player can be further improved. Moreover, the stopper member 7 can have both a weight function, for improving the operational feeling, and a restriction function of the rod 6 at the maximum depression position of the pedal 4. Also, the stopper member 7, according to the present embodiment, is movable together with the rod 6 while being guided in the axial direction L of the rod 6. Accordingly, the weight can be moved in the sliding direction of the rod 6 (axial direction L), and the operational feeling can be further improved.

In addition, the pedal 4 and the rod 6, according to the present embodiment, are coupled by the link member 5 that converts the rocking motion of the pedal 4, the rocking motion around the shaft La as the center, into the linear movement, the linear movement in the axial direction L, of the rod 6. Accordingly, the depressing operation of the pedal 4 can be reliably and appropriately converted into the linear movement of the rod 6. Alternatively, instead of the link member 5, the pedal 4 and the rod 6 may be coupled by another means, for example, a cam member or the like) converts the rocking motion of the pedal 4 into the linear movement of the rod 6.

Although the present embodiment has been described above, the present disclosure is not limited to this. For example, instead of the optical sensor 10, another non-contact sensor, such as a capacitance sensor that measures the distance between electrodes, an overcurrent displacement sensor that measures an overcurrent due to a metal plate and a magnetic field, or a laser distance measurement sensor, may be used. When the optical sensor 10 according to the present embodiment is used, the reflection surface 9*c* of the reflecting plate 9 (member to be detected) that reflects emitted light may be a reflection surface of a flat surface or a reflection surface having a concave curved section that can efficiently collect and reflect light. In the present embodiment, the control unit 16 processes both the detection signal generated by striking on the performance unit 17 and the detection signal acquired from the optical sensor 10. However, the control unit 16 may generate a musical sound by using only the detection signal acquired from the optical sensor 10.

As long as a pedal device for performance includes a detecting device with a non-contact sensor detecting an amount of displacement in an axial direction of a rod in a non-contact manner, the present disclosure is applicable to such a pedal device for performance with a different appearance shape or a pedal device for performance having an additional function.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pedal device for performance, comprising:

a pedal where a player can perform a depressing operation with his/her foot;

a rod movable in an axial direction in accordance with the depressing operation of the pedal;

a detecting mechanism detecting an amount of movement of the rod in a non-contact manner and outputting a detection signal corresponding to the amount of movement, the detecting mechanism position adjacent the rod and pedal connection;

a stopper member, including an upper portion and a lower portion, is attached to the rod, the upper portion of the stopper member including an abutting portion that abuts against an outside portion of the housing when the pedal is depressed to a maximum position, and further movement of the rod is restricted by the abutting portion abutting the outside portion of the housing, the lower portion of the stopper member passing through the housing and extending in an axial direction within the housing; and a member to be detected attached to the lower portion of the stopper member so as to be movable integrally with the rod and the stopper member inside of the housing, an axial gap between the member and the detecting mechanism that enables the detecting mechanism to detect positions of the rod and the stopper member;

wherein the detecting mechanism includes a non-contact sensor detecting an amount of displacement in the axial direction of the rod in a non-contact manner.

2. The pedal device for performance according to claim 1, wherein the stopper member has a predetermined weight.

3. The pedal device for performance according to claim 2, wherein the stopper member is movable together with the rod while being guided in the axial direction of the rod.

4. The pedal device for performance according to claim 1, wherein the pedal and the rod are coupled by a link member converting a rocking motion of the pedal into a linear movement of the rod.

5. The pedal device for performance according to claim 1, wherein the detecting mechanism includes an optical sensor that emits light toward the member to be detected, that receives reflected light from the member to be detected, and can detect positions of the rod and the stopper member.

6. The pedal device for performance according to claim 5, wherein the member to be detected includes a disk-shaped reflecting plate that is rotatably attached around the rod as a center.

7. The pedal device for performance according to claim 1, further comprising:

an urging mechanism for urging the rod; and an urging holding portion that adjustably holds an urging force of the urging mechanism.

8. A pedal device for performance, comprising:

a housing;

a pedal where a player can perform a depressing operation with his/her foot;

a rod movable within the housing and in an axial direction in accordance with the depressing operation of the pedal;

a detecting mechanism within the housing detecting an amount of movement of the rod and outputting a detection signal corresponding to the amount of movement;

a stopper member, including an upper portion and a lower portion, is attached to the rod, the upper portion of the stopper member including an abutting portion that abuts against an outside portion of the housing when the pedal is depressed to a maximum position, and further movement of the rod is restricted by the abutting portion abutting the housing, the lower portion of the stopper member passing through the housing and extending in an axial direction within the housing; and a member to be detected attached to the lower portion of the stopper member so as to be movable integrally with the rod and the stopper member inside of the housing that enables the detecting mechanism to detect positions of the rod and the stopper member;

wherein the detecting mechanism includes a non-contact sensor within the housing detecting an amount of displacement in the axial direction of the rod in a non-contact manner.

* * * * *